Feb. 20, 1962  A. B. CASTLE  3,021,585
INSTRUMENT CLAMPS
Original Filed April 26, 1954
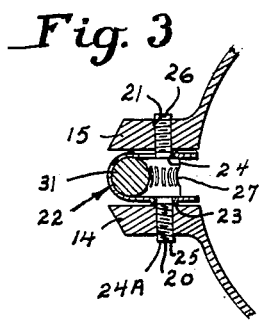
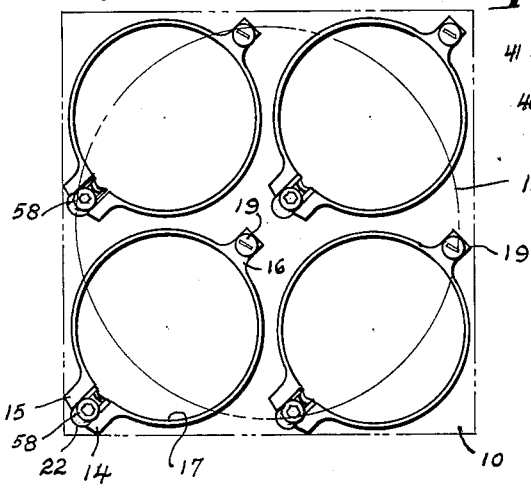
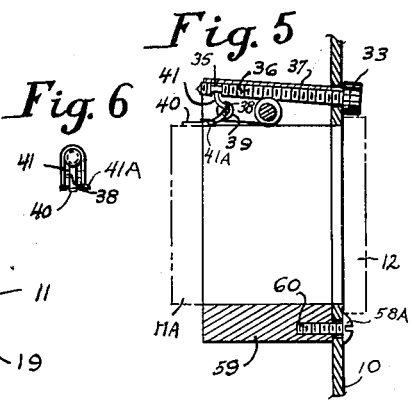
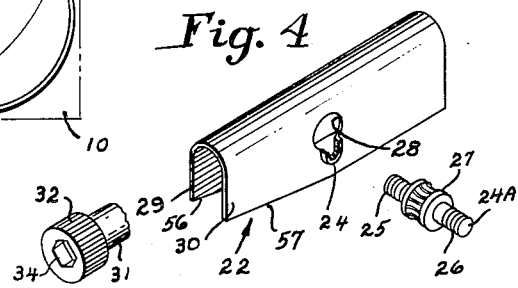
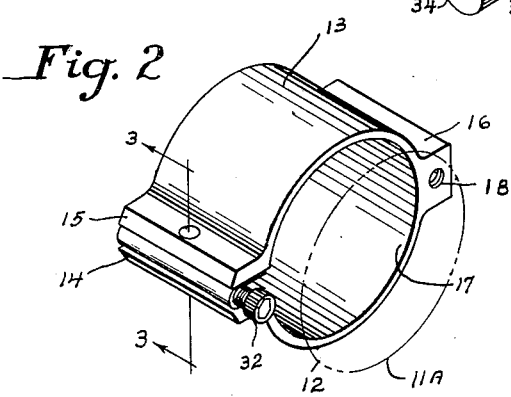
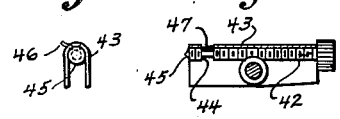
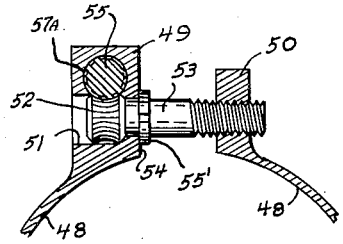
INVENTOR
A. B. Castle
BY
ATTORNEY

United States Patent Office 3,021,585
Patented Feb. 20, 1962

3,021,585
INSTRUMENT CLAMPS
Alfred Barkley Castle, Brookmont, Md.
(4004 Maryland Drive, Washington 16, D.C.)
Original application Apr. 26, 1954, Ser. No. 425,692, now Patent No. 2,938,690, dated May 31, 1960. Divided and this application Oct. 17, 1955, Ser. No. 540,969
8 Claims. (Cl. 24—279)

The present invention relates to clamps and more particularly to a clamp particularly useful for mounting instruments for rotatable adjustment in aircraft.

Heretofore various types of clamps have been used for applying circumferential pressure to the article being clamped, but most clamps have not been of the type which could be operated effectively from the front of an instrument panel, and particularly the previously known clamps could not be effectively secured to the instrument panel by the operating means, consequently the clamp with its instrument was held by a single anchoring screw and the resulting vibration would soon cause loosening of the clamp resulting in damage to the instrument and changing its adjustment. Particularly in airplanes' operation it is desirable to have the instruments be rotatably adjustable so that all of the indicating hands of the various instruments point in a predetermined direction when operation is normal so the pilot can readily observe any failure by merely observing any instrument that has its hands pointing in a different direction and consequently the pilot can quickly make any necessary change to avoid failure.

An object of the present invention is to provide a clamp which overcomes the defects of the prior clamps and is easily operable to permit securing and removing as well as adjustment of an instrument.

A further object is to provide a clamp having a minimum number of parts which can be positively operated from the exposed surface of an instrument panel.

Another object is to provide a clamp which produces a uniform mechanical advantage during the clamping action.

Other and further objects will be apparent as the description proceeds and upon reference to the accompanying drawing wherein:

FIGURE 1 is an elevation of four instrument clamps in the position which they would occupy in an instrument panel shown in phantom lines and illustrating how four 1½ in. cylindrical instruments can be mounted in the space normally taken by a single 3 in. instrument;

FIGURE 2, a perspective of an assembled instrument clamp in clamping condition;

FIGURE 3, a section taken on line 3—3 of FIGURE 2 showing the bearing construction and the screw thread arrangement as well as the worm gear action between an operating screw and the clamping shaft;

FIGURE 4, an exploded view of the bearing housing, the clamping shaft and the operating screw;

FIGURE 5, a section through a modified clamp and bearing housing showing one means to prevent removal of the operating screw when an instrument is in the clamp and also showing a means of providing a locking thread action for the anchoring screw;

FIGURE 6, an end view of the bearing housing of FIGURE 5 showing the cross shaped lever for preventing removal of the operating screw;

FIGURE 7, a fragmentary longitudinal section of a bearing housing illustrating another means for preventing withdrawal of the operating screw during the unclamping action;

FIGURE 8, an inner end view of the bearing housing and detent structure of FIGURE 7 with parts omitted;

FIGURE 9, a modification in which the clamping shaft is threaded on only one end and the clamping band is made of a single piece of material.

Referring more particularly to the drawing, four of the instrument clamps of the present invention are shown mounted in a 3¼ inch square section of an instrument panel 10, shown in phantom, which normally receives a single 3 inch diameter instrument 11 shown in phantom lines. The same size section of panel may receive four 1½ inch diameter instruments 11A shown in phantom with bezels 12 to prevent the instruments from passing completely through the instrument receiving apertures in the panel 10, the bezel also serving as a handle for inserting, removing, and adjusting the instruments in the panel.

A one piece arcuate band 13 is formed from a non-rusting material such as an aluminum alloy extrusion with enlargements 14, 15, at its ends and an anchoring lug 16 at its midpoint. The interior surface 17 of the band 13 is of cylindrical shape to snugly receive the instrument 11A. The anchoring lug 16 is provided with a threaded aperture 18 to receive an anchoring screw 19 for fixing the mid point of the clamp to the instrument panel. The enlargement 14 is provided with a left hand threaded aperture 20 and the enlargement 15 is provided with a right hand threaded aperture 21, said apertures 20 and 21 being in substantial alignment during the limited opening and closing of the clamp.

A U-shaped channel bearing housing 22 lying between enlargements 14 and 15 has aligned bearing surfaces 23 and 24 adjacent the midpoint of each free edge of the channel which may be formed by a punching operation through the sheet material from which the bearing housing is formed thereby increasing the effective area of the bearing surfaces over the thickness of the sheet material.

The bearing surfaces 23 and 24 of the U-shaped channel bearing housing 22 are in registry with the apertures 20, 21 of the enlargements 14 and 15. A clamping shaft 24A having left hand threads 25 at one end and right hand threads 26 at the other end has a worm gear 27 intermediate its ends fixed to the shaft 24A. The shaft 24A has journals on opposite sides of the worm gear 27 for rotative engagement with bearing surfaces 23, 24, the aperture forming the bearing surface 24 merging with a larger recess 28 of sufficient size to receive the worm gear 27, the aperture 23 being enlarged sufficiently to permit any slight canting which may be necessary when the shaft 24A and the worm gear 27 is inserted between the web portions 29, 30 of the U-shaped channel member 22.

A headed right hand threaded operating screw 31 having threads corresponding to a conventional 6–32 screw and having a shoulder 32 formed by its head has its threaded end extending into the bight portion of the bearing housing 22 with its threads cooperating with the teeth of the worm gear 27, the shoulder 32 of the operating screw head being adapted to engage the exposed surface of the instrument panel whereby clockwise rotation of the right hand threaded operating screw 31 will cause the clamping shaft 24A to rotate in the proper direction for oppositely threaded ends 25, 26 of the shaft to draw the ends of enlargements 14, 15 of the band 13 together until the instrument 11A is securely clamped whereupon further rotation of the screw 31 will draw the housing 22 and the enlargements 14, 15 tightly against the unexposed surface of the instrument panel 10 thereby securely fixing the instrument clamp with the instrument therein tightly against the instrument panel, the worm gear 27 being prevented from rotation because of the clamping force of band 13 and consequently worm gear 27 serves as a fixed nut.

As noted in FIGURE 1, the instrument clamps are secured to the instrument panel in such a manner as to increase the rigidity of the panel thereby making it possible to use a panel of less strength than has been required heretofore when the clamp was held against the panel at only its anchoring point.

In FIGURES 5 and 6 an operating screw having a knurled head 33 with an Allen type hexagonal socket 34 for receiving a wrench therein has a groove 35 formed adjacent the other end of the threaded portion 36. The bearing housing 37 is similar to bearing housing 22 but is provided with a cross-shaped detent member including a transverse portion 38 with the ends of the transverse portion rotatively mounted in apertures 39 in the webs of the housing. The stem 40 and the tip 41 of the cross member 38 are bent into a J-shape with the tip engageable in the groove 35 of the operating screw and the stem 40 engageable with an instrument 11A so that the tip 41 is pressed into the groove 35 when the instrument is in position as shown in phantom thereby preventing removal of the screw. This action prevents the screw from backing out when the screw 36 is rotated in a counterclockwise or releasing direction thereby making it unnecessary to provide an axial pressure on the screw head to prevent the screw from being withdrawn from the bearing housing 37 during the unclamping operation. A second cross member 41A is adapted to engage the inner ends of the webs of the bearing housing to prevent the tip 41 from being drawn toward the panel when the screw 36 is operated to release the clamp.

In the modification of FIGURES 7 and 8, a portion of an operating screw 42 is received in a bearing housing 43 in the usual manner and such screw is provided with a groove 44 and a sharpened point 45. A tongue 46 is struck from the material in the bight portion of the inner end of the bearing housing 43 and such tongue is twisted forming a detent portion 47, the inner edge of which detent portion is received in the groove 44 preventing the withdrawal of the screw 42 thereby causing such screw to positively open the clamp upon clockwise rotation of the screw. The tongue 46 may be released by engagement with the projecting end to withdraw the detent portion 47 from the groove 44.

The modification shown in FIGURE 9 has a continuous strap 48 with an enlargement forming a gear housing block 49 fixed to one end and a second enlargement or block 50 having an internally threaded bore fixed on the other end. The block 49 is provided with a recess 51 receiving a worm gear 52 fixed on a threaded clamping shaft 53 which is journaled in a bore 54 in the block 49. The shaft 53 is threaded into the block 50 whereby rotation of the shaft will draw the blocks 49 and 50 together or separate the blocks from one another thereby producing a clamping or unclamping action. An operating screw 55 having a head, not shown, is rotatably mounted in a smooth bore 57A so that the screw can be rotated without endwise movement and thereby rotate the worm gear 52, and the threaded clamping shaft 53. Although the interengagement of the worm gear 52 and the operating screw 55 prevents axial movement of the worm gear 52 and shaft 53 during the unclamping movement and the blocks 49 and 50 are urged apart, it is found desirable in some circumstances to provide a split ring 55' which is mounted in a groove in the shaft 55 to take the end thrust in the unclamping operation.

Although the webs 29 and 30 of the bearing housing 22 may have straight edges, a portion of the edges adjacent to the panel may be cut away to provide inclined edge portions 56, 57 so that the heads 58 of the operating screws 31 can be spaced from the center of the instrument the same distance as the heads of the anchoring screws 19. However, it is believed that certain advantages are obtained by having the heads 58 of the operating screw spaced a different distance from the center of the instruments than the anchoring screws 19 so that the mechanic installing the instrument clamp will have all of the operating screws in the same relative position to the instrument receiving openings so that no question arises as to the proper mounting of the clamps.

The strap 13 may be made of an aluminum extrusion or other suitable non-magnetic and non-corroding material. The strap and other portions of the clamp including the screws may be made of stainless steel which is non-corroding and non-magnetic and the operating screw may be made of brass if desired and therefore the instrument clamp does not affect the magnetic compass on an airplane or other structure on which the clamp is used.

In FIGURE 5 an anchoring screw 58A secures the instrument to the panel 10 by having its threaded end extend into a threaded aperture in the lug 59. A suitable form of thread may be obtained by initially threading the aperture 60 and inserting a helical spring device which forms the screw engaging thread. Such a device is sold under the trade name Helicoil and is screwed into the threads in the aperture 60 and is prevented from removal therefrom by a spring locking action. The Helicoil also serves as a locking means to prevent the anchoring screw 58A from being loosened by vibration.

Although the clamps shown are cylindrical it is contemplated that the clamps may be of various shapes including polygonal or partially curved and partially polygonal and several bearing housings and clamping shafts may be used on a single clamp, for example where a square object is clamped the bearing housings may be located at diagonally opposite corners and each strap made to cover two sides of the square.

The instrument clamp may be made in many different sizes such as 2 inch or 3 inch diameter and may be made in still larger or still smaller sizes. The clamps may be used for many other applications in addition to instruments such as radiator hose clamps or the like.

Although specific modifications have been shown it will be apparent that changes may be made within the scope of the claims without departing from the spirit of the invention.

This application is a division of my application Serial Number 425,692 filed April 26, 1954, and now Patent Number 2,938,690.

I claim:

1. A clamp for mounting in a panel having a circular instrument receiving aperture for receiving a cylindrically shaped instrument with a benzel of sufficient size to prevent complete passage of the instrument through the aperture and serving as a handle for rotating the instruments and permitting the mounting of many instruments in a minimum of panel space, said clamp comprising a one piece arcuate band with integral enlargements at its ends and an anchoring lug substantially at its midpoint, the interior of said band being of generally cylindrical shape, said enlargements being provided with opposed aligned interiorly threaded apertures, a U-shaped channel lying between said enlargements and having aligned bearing surfaces adjacent the midpoint of each free edge of the U-shaped channel, said bearing surfaces being in registry with said threaded apertures, a clamping shaft, a worm gear fixed on said clamping shaft intermediate the ends thereof, said clamping shaft being oppositely threaded on its opposed ends for positive connection with the threads in said apertures in the end enlargements of said band, a headed clamping screw of a length between the shoulder formed by its head and its other end to extend from the exposed surface of the instrument panel to beyond said worm gear so the shoulder of said head may engage the exposed surface of the panel and its threads engage the teeth of said worm gear, the inner surface of the bight portion of the U-shaped channel providing a bearing for maintaining said clamping screw in operative position relative to said worm gear whereby the clamp may be actuated from the exposed surface of said panel.

2. A clamp for mounting in a panel having instrument receiving apertures for the mounting of instruments and permitting the mounting of many instruments in a minimum of panel space said clamp comprising a one piece band, the interior of said band being of a shape corresponding to the shape of said instruments, the ends of each clamp being provided with aligned opposed interiorly threaded apertures, a bearing housing lying between said ends and having bearing surfaces for registry with said threaded apertures, a clamping shaft, a worm gear fixed on said clamping shaft, said clamping shaft being oppositely threaded on its ends for positive connection with the threads in said apertures in the ends of said band, a headed clamping screw of a length to extend from the exposed surface of the instrument panel to said worm gear so the shoulder formed by said head may engage the exposed surface of a panel and its threads simultaneously engage the teeth of said worm gear, the housing providing another bearing surface for maintaining said clamping screw in operative position to said worm gear whereby the clamp may be actuated from the exposed surface of said panel.

3. The invention according to claim 2 in which the band is provided with an anchoring lug intermediate the ends of said band.

4. The invention according to claim 3 in which the anchoring lug is provided with coil spring threads for cooperation with an anchoring screw.

5. The invention according to claim 2 in which means are provided to prevent removal of the headed clamping screw from said bearing housing.

6. The invention according to claim 2 in which releasable means are provided to prevent removal of the clamping screw from the housing.

7. The invention according to claim 6 in which the releasable means to prevent removal of the clamping screw is a detent on the housing.

8. The invention according to claim 1 in which the clamp is mounted in a panel having a circular opening registering with the cylindrical interior of said clamp and the headed clamping screw passes through an aperture in the panel to provide for operation of the clamp from the side of the panel opposite the clamp, and a headed anchoring screw passing through another aperture in said panel and threaded into said anchoring lug of said clamp.

References Cited in the file of this patent

UNITED STATES PATENTS

| | | |
|---|---|---|
| 79,340 | Gilman | June 30, 1868 |
| 1,206,853 | Jones | Dec. 5, 1916 |
| 1,409,606 | Stendahl | Mar. 14, 1922 |
| 1,599,189 | Smith | Sept. 7, 1926 |
| 1,672,488 | Hall | June 5, 1928 |
| 1,682,194 | Selah | Aug. 28, 1928 |
| 1,765,397 | Birkenmaier | June 24, 1930 |
| 1,992,505 | Prosky | Feb. 26, 1935 |
| 2,167,176 | Grassberger | July 25, 1939 |
| 2,408,347 | Sprouce | Sept. 24, 1946 |
| 2,577,063 | Zaleske | Dec. 4, 1951 |
| 2,580,396 | Bluth | Jan. 1, 1952 |
| 2,616,644 | Christophersen | Nov. 4, 1952 |
| 2,683,006 | Nichols | July 6, 1954 |
| 2,684,221 | Wollam | July 20, 1954 |
| 2,750,645 | Seltzer | June 19, 1956 |
| 2,775,281 | Smith | Dec. 25, 1956 |
| 2,886,088 | Brancato | May 12, 1959 |

FOREIGN PATENTS

| | | |
|---|---|---|
| 472,901 | France | Aug. 24, 1914 |